United States Patent [19]

Rose et al.

[11] Patent Number: 5,059,839

[45] Date of Patent: Oct. 22, 1991

[54] EXPLOSIVE MAGNETIC FIELD COMPRESSION GENERATOR TRANSFORMER POWER SUPPLY FOR HIGH RESISTIVE LOADS

[75] Inventors: Millard F. Rose, King George Co., Va.; Lawrence H. Luessen, Upper Marlboro, Md.; Monty P. Villere, New Orleans, La.

[73] Assignee: Unites States of America as represented by the Secretary of the Navy, Washington, D.C.

[21] Appl. No.: 797,168

[22] Filed: May 16, 1977

Related U.S. Application Data

[63] Continuation of Ser. No. 585,268, Jun. 9, 1975, abandoned.

[51] Int. Cl.$^5$ .............................................. H20K 7/00
[52] U.S. Cl. .......................................... 310/10; 89/8
[58] Field of Search ...................... 310/4 R; 89/6.5, 8; 321/1.5, 2

[56] References Cited

U.S. PATENT DOCUMENTS

| | | | |
|---|---|---|---|
| 2,510,800 | 6/1950 | Chilowsky | 310/4 |
| 3,310,689 | 3/1967 | Heinmets | 310/4 |
| 3,316,474 | 4/1967 | Lode | 321/1.5 |
| 3,484,627 | 12/1968 | Conger et al. | 310/10 |
| 3,564,305 | 2/1971 | Cummings | 310/10 |
| 3,878,409 | 4/1975 | Gill et al. | 89/8 |

FOREIGN PATENT DOCUMENTS 1107216 3/1968 United Kingdom .................. 310/10

OTHER PUBLICATIONS

Villere et al., "Explosive Magnetic-Field Compression Generator Transformer Coupled to a High Resistance", 7/72, pp. 1-25, NWL Technical Report TR-2784.
Waniek, "Chemical to Electromagnetic Energy Conversion Tech.", 6/74, pp. 1-157, Final Report, Gripiss A. E. B., #AD783901/2.
Fowler, "Introduction to Explosive Magnetic Flux Compression . . . ", 2/75, pp. 1-31, NTIS, LA-589-0-MS.
Bangerter et al., "Explosive Magnetohydrodynamics", 8/67, pp. 1-181, Final Report, NJIS AD 818887.
Komelkow, "Technology of Large Impulse Current and . . . ", 12/4/71, Transforming Section, AD736-910 NTIS.

Primary Examiner—Nelson Moskowitz
Attorney, Agent, or Firm—John D. Lewis; Kenneth E. Walden

[57] ABSTRACT

An explosive flux compression generator is coupled to a high resistance load by a pulse transformer. Chemical energy is converted to electromagnetic energy and is transferred by means of the transformer to the high resistance load. The transformer allows coupling to a higher resistive load than is achieved with a transformerless-generator system having a current gain greater than unity.

13 Claims, 2 Drawing Sheets

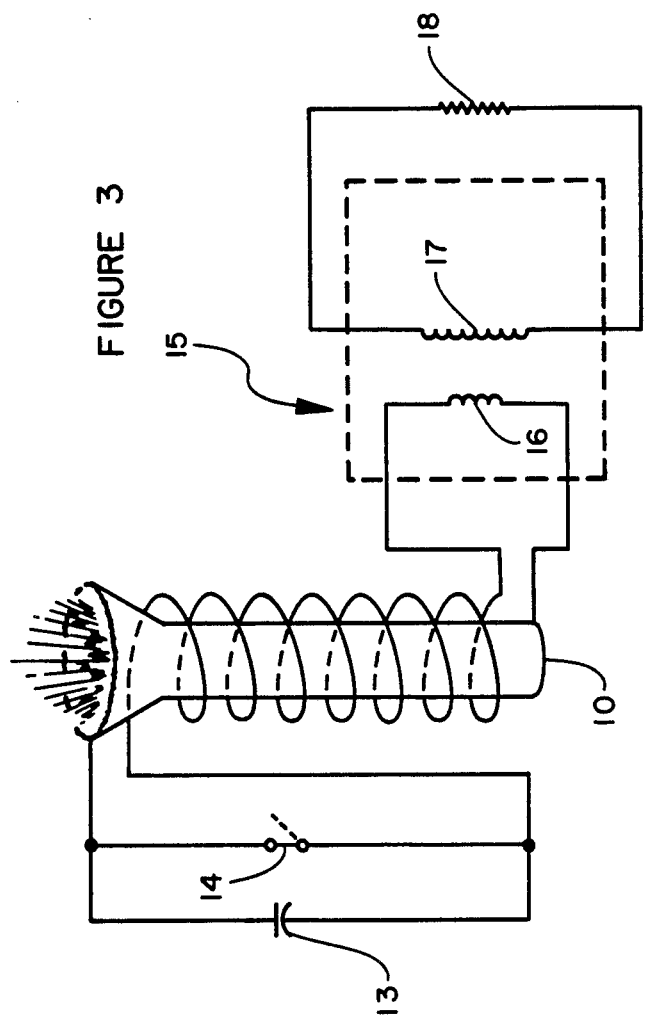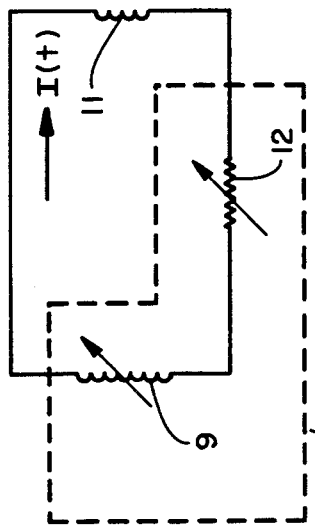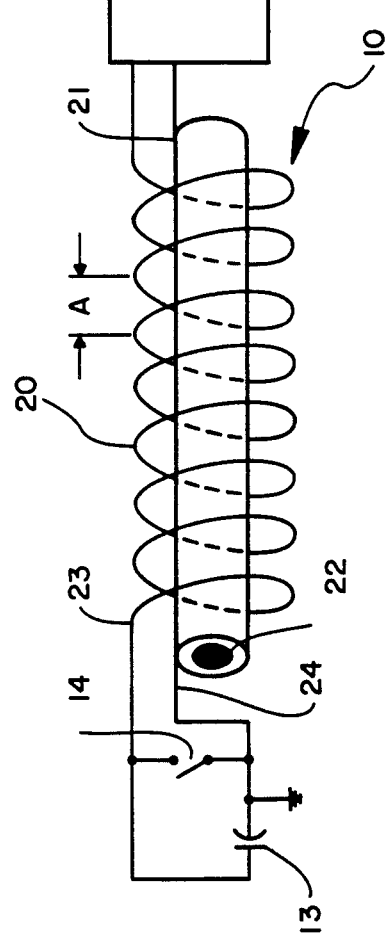

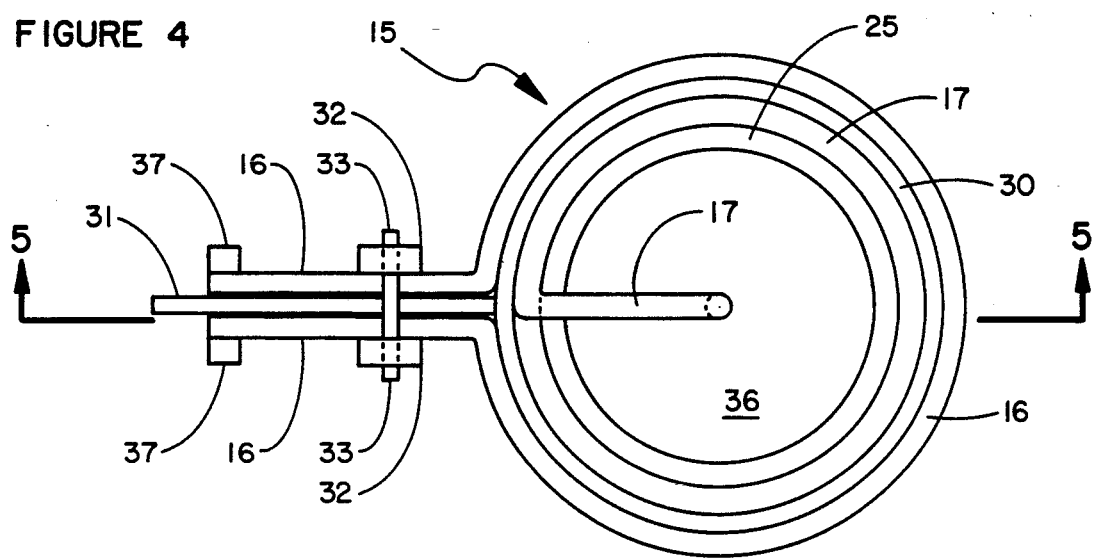
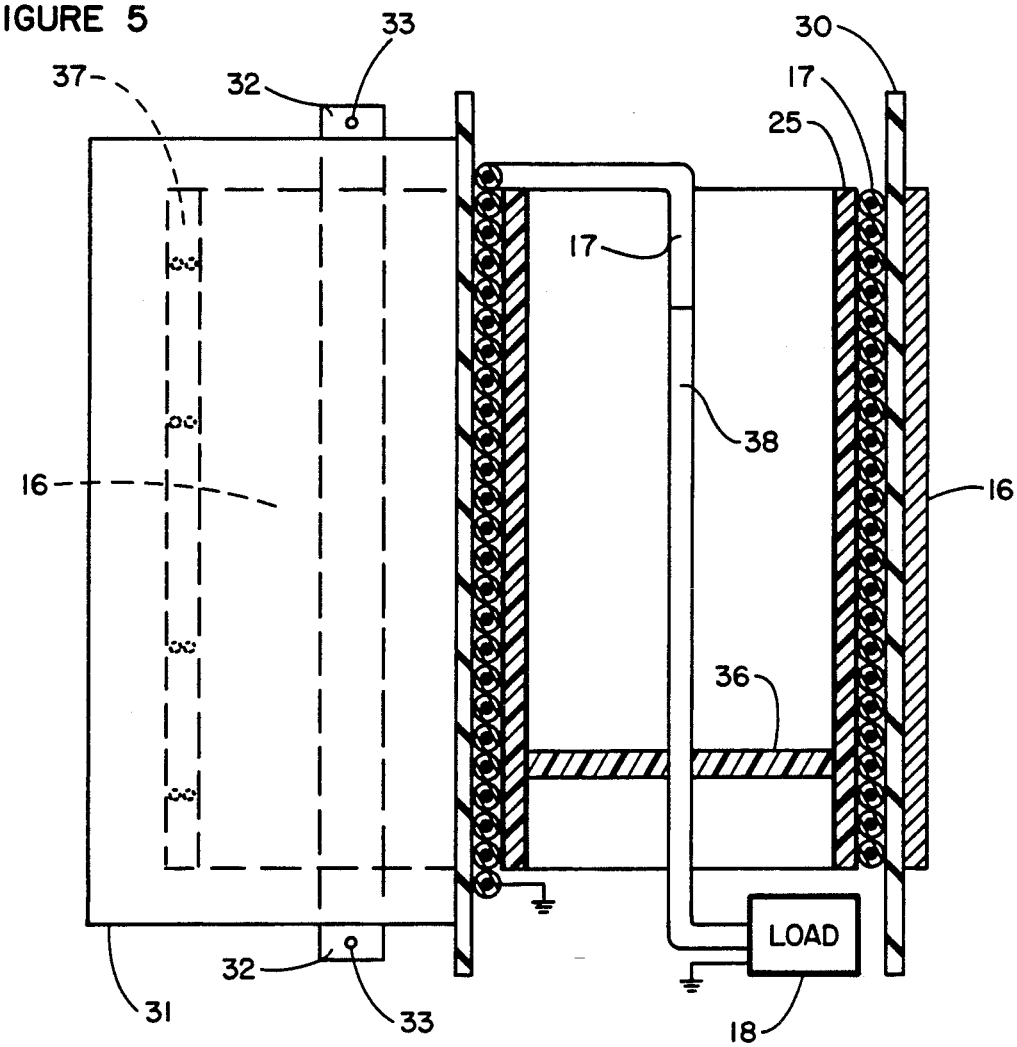

5,059,839

EXPLOSIVE MAGNETIC FIELD COMPRESSION GENERATOR TRANSFORMER POWER SUPPLY FOR HIGH RESISTIVE LOADS

This is a continuation of application Ser. No. 585,268, filed June 9, 1975.

BACKGROUND OF THE INVENTION

The old methods of feeding high energy to high resistance loads in short times consisted primarily of Marx Generators, Pulse Forming Networks and Capacitor Banks. In general these devices are quite large and bulky and have low energy density (less than 100 joules per pound). This makes them undesirable for portable or airbourne operations.

An explosive magnetic field compression generator (e.g. strip line, helical, cylindrical, plate) directly converts chemical energy of high explosives to electromagnetic energy. This is generally accomplished by using explosive energy to drive metal conductors (referred to as armatures) against magnetic fields. The conversion efficiency (i.e., electromagnetic energy ÷ explosive chemical energy), can be as high as 15%.

Since the energy contained in high explosive is large (2 megajoules/pound), the energy produced in the magnetic field can also be quite large. Using a large helical generator, up to four megajoules has been produced in magnetic field energy.

The field compression generator operates into a load that is normally inductive with negligible resistance. The key to obtaining good gain is to have a large ratio of initial generator inductance to load inductance. This puts an upper limit on the size of the load inductance, as the quantity of explosive needed for a large generator becomes impractical. In practice one is usually limited to inductive loads of order ten microhenries and less.

The load resistance must be kept below 0.1 to 1 ohm if a good energy gain is to be obtained. Resistance in the generator circuit introduces a damping effect which if too large will negate any gain produced by magnetic field compression.

SUMMARY OF THE INVENTION

The invention described herein offers a system to replace the old techniques in a single shot environment. The invention is much more compact for a given energy-load requirement having a very high energy density (2000 joules/pound).

A transformer couples an explosive flux compression generator to resistance loads higher than the maximum allowable resistance (usually greater than one ohm) for a generator having at least unity energy gain. The device transfers greater energy to the high resistance load than the initial electrical energy in the generator.

This invention might be used in a deliverable system (missile warhead) consisting of a small energizing seed source (e.g., high energy density capacitors or explosive magneto-hydrodynamic generator), an explosive flux compressor, a pulse transformer system and a deployable antenna. When used against an enemy SAM site, the antenna could be deployed, the explosive flux compressor detonated after appropriate energizing, thereby the transformer applying a large voltage pulse to the antenna terminals. The antenna would then radiate a large pulse of RF at its resonant frequency, possibly coupling a part of this energy onto the cable members or other inadvertent path of the target SAM site. This could very possibly lead to component burn-out or upset in the sub-systems that are connected via the cable members.

STATEMENT OF THE OBJECTS OF THE INVENTION

An object of this invention is to provide a compact, highly energetic power supply for use with high resistance loads in a deliverable system.

Other objects, advantages and novel features of the invention will become apparent from the following detailed description of the invention when considered in conjunction with the accompanying drawings.

BRIEF DESCRIPTION OF THE DRAWINGS

FIG. 1 is a prior art circuit diagram for a magnetic field compression generator connected to a load but without a transformer.

FIG. 2 is a prior art schematic of a helical magnetic-field compression generator with constant pitch.

FIG. 3 is a circuit diagram for an explosive flux compression generator coupled to a load through a transformer.

FIG. 4 is a top view of the pulse transformer shown schematically in FIG. 3.

FIG. 5 is a cross sectional view along the line 5—5 of FIG. 4.

DETAILED DESCRIPTION OF THE INVENTION

The explosive magnetic field compression generator operates by explosively decreasing the inductance of a circuit rapidly enough to approximately conserve magnetic flux. The basic magnetic field compression generator circuit with no transformer is shown in FIG. 1. The generator 10 is normally connected to an inductive load 11. The inductance 9 of the generator is represented by $L_G(t)$, $I(t)$ is the current at time t, and $R(t)$ represents the total resistance 12 of the generator 10; $L_L$ is the load inductance 11. A magnetic field is initially established in the inductors of the generator ($L_G(t)$) and of the load ($L_L$). $L_G(t)$ is then decreased to zero. If this decrease occurs rapidly enough, the damping effect due to the resistance 12 is too small to change the magnetic flux appreciably. Since magnetic flux is roughly conserved ($[L_G(t)+L_L]I \approx$ constant), the current I will increase as $L_G$ decreases. The resistance 12 is also variable since the generator resistance changes with time as the generator operation progresses. If the resistance 12 is too large the damping effect will predominate, magnetic flux will not be conserved and the current will damp out.

The generator 10 depicted in FIG. 2 is helical and of a single stage design (i.e., the pitch of the turns is constant (A=constant) throughout the generator). An outer conducting coil 20 surrounds the explosively filled armature 21 wherein the main detonator is located 22. The generator 10 has an initial inductance of about 20 microhenries, a time rate of change of inductance of approximately 0.3 henries/second and a time duration of about 48 microseconds. Each armature holds approximately 150 grams of C-4 high explosive. One SE-1 detonator is employed to initiate the explosive. A second SE-1 detonator is used as a "crowbar" switch 14 to short out the 3 kilojoule, 20 kilovolt capacitive seeding source 13 once the main detonator commenced generator operation. The second detonator may not be necessary if in exploding, the first detonator shorts out the capacitor bank. The armature may short out the bank as it expands, thus preventing the generator from directing its energy back to the capacitor bank. That is, the exploding armature has an expansion angle whereby the ground lead 24 of the generator is pushed out and contacts the input lead 23 of the generator thereby causing the short.

A multi-stage helical generator can be used. Technically, it is difficult to construct a helical generator having a continuously variable pitch, hence a similar effect is achieved by multi-staging. In this design, the pitch in each stage is constant and increases from one stage to the next along the coil length.

FIG. 3 represents the general circuit employed, showing the seeding capacitor bank 13, crowbar switch 14 (closed), exploding generator 10, pulse transformer 15 and resistive load 18. Strictly speaking, the load on the secondary 17 of the transformer is not purely resistive but probably also contains a small amount of inductance.

A top view of the pulse transformer 15 used for coupling the magnetic field compression generators to high load resistances is shown in FIG. 4.

The transformer 15 has for its secondary 17 fifty turns of a high voltage coaxial cable of low capacitance and low attenuation (with the outer insulation and outer conductor removed), wrapped securely around a 14-inch section of 10-inch (O.D.) plexiglass tubing 25. To insure against breakdown, a ¼-inch piece of polyethylene 36 has been placed near the bottom of the plexiglass tubing 25.

To insulate the secondary 17 from the primary 16, ten layers of 10-mil Mylar 30 have been wrapped around the secondary 17, extending approximately eight inches above the high voltage end of the secondary 17, and two inches below the low voltage end. (See FIG. 5.)

The primary 16 of the transformer 15 consists of one turn of 1/32-inch copper sheet placed over the Mylar-insulated secondary 17. To accomodate the low inductance leads from the magnetic field compression generators, two 12-inch pieces of ¼-inch aluminum 37 have been fastened to the primary leads. The primary leads are separated by one sheet of 30-mil polyethylene 31, and secured by two pieces of 1-inch plexiglass 32 and nylon thread screws 33.

The load impedance divided by the turns ratio squared should be less than one ohm. The turns ratio equals the number of turns of the secondary divided into the number of turns of the primary.

The high-voltage end of the secondary 17 is connected to one of the leads from the resistive load 18 by means of the center conductor of a 4-foot length of high voltage (600KV) coaxial cable 38. The other lead of the resistive load is connected to the low voltage end of the secondary where upon they are accomodated between the aluminum strip 37 and the primary lead 16.

The resistive loads 18 used are copper sulfate solutions. The load resistances are 60, 120, and 220 ohms (using a single stage generator) and 110 and 240 ohms (using a multi-stage generator). These loads are well above the maximum allowable resistance for a generator having no transformer. The electrical energy produced in the load in each case is higher than the initial electromagnetic energy in the explosive generator.

Energies delivered to the loads range from 820 joules (60 ohms) to 1800 joules (120 ohms) for the single stage and from 170 joules (240 ohms) to 3100 joules (110 ohms), for the multi-stage. The highest energy gain (energy dissipated in resistive load divided by initial magnetic energy in generator) occurs in the 60 ohm shot and is 4.6. Peak transformer secondary voltages reach about 200 kilovolts, with peak transformer primary currents of 170 kiloamps and generator current gains of 20 (in circuits using a single stage generator). Where multi-stage generators are used, peak transformer secondary voltages reach about 110 kilovolts, with peak transformer primary currents of 200 kiloamps and generator current gains of 67.

Obviously many modifications and variations of the present invention are possible in the light of the above teachings. It is therefore to be understood that within the scope of the appended claims the invention may be practiced otherwise than as specifically described.

What is claimed is:

1. A compact device for use in a single shot environment wherein high energy is fed to resistance loads in a short time, comprising:
   an explosive flux compression generator having at least unity energy gain;
   a pulse transformer electrically connected to said generator;
   a resistive load operatively connected to said transformer; and
   means to detonate said generator.

2. The device of claim 1 wherein said generator is a helical type of single stage design.

3. The device of claim 2 wherein said resistive load is greater than one ohm.

4. The device of claim 3 wherein said resistive load is an antenna.

5. The device of claim 2 wherein said pulse transformer is an air-core, high voltage transformer having close coupling of the primary and secondary and with a turns ratio less than one.

6. The device of claim 5 wherein said transformer comprises:
   a plexiglass tube;
   a high voltage electrical cable encircling said tube wherein the conductor of said cable forms the secondary of said transformer;
   at least one Mylar sheet encircling said cable; and
   at least one sheet of copper encircling said Mylar and forming the primary of said transformer.

7. The device of claim 2 wherein said means to detonate said generator comprises:
   a capacitive seeding source electrically connected to said generator; and
   a detonator operatively located within an explosive filled armature of said generator.

8. The device of claim 1 wherein said generator is a multi-stage helical generator.

9. The device of claim 8 wherein said resistive load is greater than one ohm.

10. The device of claim 9 wherein said resistive load is an antenna.

11. The device of claim 8 wherein said pulse transformer is an air-core, high voltage transformer having close coupling of the primary and secondary and with a turns ratio less than one.

12. The device of claim 11 wherein said transformer comprises:
   a plexiglass tube;
   a high voltage electrical cable encircling said tube wherein the conductor of said cable is the secondary of said transformer;
   at least one Mylar sheet encircling said cable; and at least one sheet of copper encircling said Mylar and forming the primary of said transformer.

13. The device of claim 8 wherein said means to detonate said generator comprises:

a capacitive seeding source electrically connected to said generator; and a detonator operatively located within an explosive filled armature of said generator.

* * * * *